(12) United States Patent
Tabeling

(10) Patent No.: US 6,695,191 B1
(45) Date of Patent: Feb. 24, 2004

(54) OPTICAL FIBER CLEAVER

(75) Inventor: Joseph W. Tabeling, Wilmington, DE (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/414,581

(22) Filed: Oct. 8, 1999

(51) Int. Cl.⁷ .............................. B26F 3/00; B26D 3/08
(52) U.S. Cl. .............................. 225/95; 83/879; 225/96; 225/103
(58) Field of Search ............. 30/109, 113; 83/879–887, 83/20, 21; 225/1–5, 93–106, 96.5

(56) References Cited

U.S. PATENT DOCUMENTS

| | | | |
|---|---|---|---|
| 2,521,854 A | * | 9/1950 | King .......................... 30/109 |
| 3,903,598 A | * | 9/1975 | Lefebvre ..................... 30/112 |
| 4,203,539 A | * | 5/1980 | Miller ......................... 225/2 |
| 4,216,004 A | * | 8/1980 | Brehm et al. ................. 225/2 |
| 4,619,387 A | | 10/1986 | Shank et al. |
| 4,621,754 A | | 11/1986 | Long et al. |
| 4,644,647 A | * | 2/1987 | Szostak et al. ............ 30/164.9 |
| 4,852,244 A | | 8/1989 | Lukas |
| 4,976,390 A | | 12/1990 | Gee et al. |
| 5,031,321 A | | 7/1991 | Briscoe |
| 5,063,672 A | | 11/1991 | Grois et al. |
| 5,088,637 A | | 2/1992 | Teurlings |
| 5,123,581 A | | 6/1992 | Curtis et al. |
| 5,125,549 A | | 6/1992 | Blackman et al. |
| 5,301,868 A | | 4/1994 | Edwards et al. |
| 5,345,952 A | * | 9/1994 | Nielander ................... 131/248 |
| 5,351,333 A | | 9/1994 | Chambers |
| 5,360,464 A | | 11/1994 | Yamauchi et al. |
| 5,395,025 A | | 3/1995 | Borer et al. |
| 5,501,385 A | | 3/1996 | Halpin |
| 5,563,974 A | | 10/1996 | Carpenter et al. |
| 5,838,850 A | | 11/1998 | Mansfield et al. |
| 5,946,986 A | | 9/1999 | Dodge et al. |
| 5,949,938 A | | 9/1999 | Tabur et al. |
| 6,023,996 A | | 2/2000 | Dodge et al. |
| 6,189,757 B1 | * | 2/2001 | Yoshida et al. .............. 225/96 |

FOREIGN PATENT DOCUMENTS

| | | | | |
|---|---|---|---|---|
| GB | 2046242 A | * | 11/1980 | ........... C03B/37/16 |
| GB | 2308361 | | 6/1997 | |
| JP | 59142503 A | * | 8/1984 | ............ G02B/5/14 |
| JP | 04035899 A | * | 2/1992 | ............ B26F/3/00 |
| WO | WO 91 03750 | | 3/1991 | |
| WO | WO 98 47030 | | 10/1998 | |

\* cited by examiner

*Primary Examiner*—Allan N. Shoap
*Assistant Examiner*—Isaac N Hamilton
(74) *Attorney, Agent, or Firm*—Davis Wright Tremaine LLP; George C. Rondeau, Jr.

(57) ABSTRACT

A device for cleaving optical fibers is provided. The device includes a housing assembly having an opening therein for receiving an optical fiber to be cleaved, and housing bending and cutting members which are reciprocally moveable in a direction transversally and substantially perpendicularly to the longitudinal axis of an optical fiber inserted into and through the opening into the housing. The housing assembly optionally has a removeably connected receptacle for receiving the cut ends of a plurality of cleaved fibers.

25 Claims, 3 Drawing Sheets

OPTICAL FIBER CLEAVER

BACKGROUND OF THE INVENTION

The invention relates to methods and tools for cleaving optical fibers.

Optical fibers are used increasingly frequently in waveguides and in communications systems, generally, wherein light energy is transmitted through very long distances within optical fibers with little or no concomitant energy losses. Devices using optical fibers often must be coupled, and such coupling requires the severance of and the reconnecting thereof of the transmitting fibers, which are made, generally, of glass. Loss of light energy at a coupling is detrimental to most transmissions and is to be avoided.

A junction between light fibers should be as near-perfect as possible; that is, the glass-to-glass interface should abut precisely one fiber to another, to minimize energy losses and signal imperfections at these junctures. To accomplish precise joining, a precision cleaving tool must be employed.

Miles of optical fibers are installed "in the field", that is, removed from precision instrumentation. Various cleaving tools have been devised for field use, which provide various degrees of acceptability for the cleaved joint and for ease of operation, which also is of paramount importance in field use. Repeatability and consistency in cleavage are important considerations for any field tool.

It is well known that an optical fiber which is bent and then scribed or nicked will break at the scribe as a result of the variation in tensile stress across the cross-section of the fiber created by the bend. The break will generally be brittle and leave only slight imperfections across the fiber cross-section which can be removed by polishing, to produce an acceptable, virtually imperfection-free surface and subsequent joint.

An example of a known scribe-and-break tool for field use is found in U.S. Pat. No. 5,301,868. That patent discloses a scribe-and-break tool for fracturing the free end of an optical fiber said to be suitable for hand-holdable configurations and field use. The tool has an elongated body and a plunger that actuates a blade for scribing the free end of an optical fiber retained in tension within a depressible head that extends outwardly from the body. The free end of the optical fiber contacts the blade, thereby scribing the free end of the fiber causing the free end to break off.

See also the patents referred to and distinguished in U.S. Pat. No. 5,301,868; especially U.S. Pat. No. 5,063,672 which discloses an alternative hand held tool for scoring and severing an optical fiber and is said to be suitable for field use.

SUMMARY OF THE INVENTION

A device for cleaving optical fibers is provided. The device includes a housing assembly having an opening therein for receiving an optical fiber to be cleaved, and housing bending and cutting means which are reciprocally moveable in a direction transversely and substantially perpendicularly to the longitudinal axis of an optical fiber inserted into and through the opening into the housing. The housing assembly optionally has a removably connected receptacle for receiving the cut ends of a plurality of cleaved fibers. Upon insertion of an optical fiber through the opening and into the housing, and upon actuation of the bending and cutting means, the fiber is sequentially bent and cleaved and the cut free end is collected in the receptacle.

In operation, preferably the fiber is sheathed within an insulating ceramic ferrule such that the fiber extends outwardly from the ferrule exposing a free end thereof, and the opening in the housing has a diameter large enough to receive the ferrule. The housing includes therein positioning means disposed in close proximity to the opening, which positioning means prevent the fiber/ferrule assembly from insertion into the housing beyond the positioning means, with the sequential bending and cutting means located within the housing so as to provide bending and cutting leaving a predetermined, exposed short length of fiber extending beyond the ferrule after the cutting.

The positioning means may be a stop extending partially over the opening in the housing providing a shoulder within the housing upon which the ferrule rests. The shoulder is positioned at a predetermined depth externally from the opening and internally into the housing, beyond which shoulder the ferrule is prevented from further insertion.

Preferably the cleaving device has sequential bending and cutting means including a boot-shaped pushing head mechanism having an apex or toe and having affixed thereto a cutter, the pushing head being operable to move reciprocally within the housing and adjacent the opening in the direction transversely and substantially perpendicularly to a fiber inserted into and through the opening. The boot toe and cutter are positioned apart from one another along the fiber axis such that, upon movement of the boot toward the fiber, the toe pushes upon and bends the fiber in advance of the cutter contacting and cutting the fiber. The cutter is affixed to the boot such that the cutter contacts and cuts the fiber at a predetermined depth externally from the opening into the housing.

The cutting means is preferably a diamond knife.

The pushing head mechanism is operable by means including a spring-loaded plunger and connecting rod affixed thereto, the plunger being reciprocatingly mounted within a cylinder in a side wall of the housing. In field use, the pushing head is manually operable, in its simplest form by the thumb action of an operator pushing upon the plunger.

The housing assembly and receptacle may be fabricated of aluminum or other metal or another suitable material such as a plastic, e.g. a polycarbonate or a nylon. A preferred material is a glass-filled polycarbonate.

DETAILED DESCRIPTION OF THE INVENTION AND PREFERRED EMBODIMENT WITH REFERENCE TO THE DRAWINGS

A device for cleaving optical fibers is provided. The device includes a housing assembly having an opening therein for receiving an optical fiber to be cleaved, and housing bending and cutting means which are reciprocally moveable in a direction transversely and substantially perpendicularly to the longitudinal axis of an optical fiber inserted into and through the opening into the housing. The housing assembly optionally has a removably connected receptacle for receiving the cut ends of a plurality of cleaved fibers.

Figure 1:
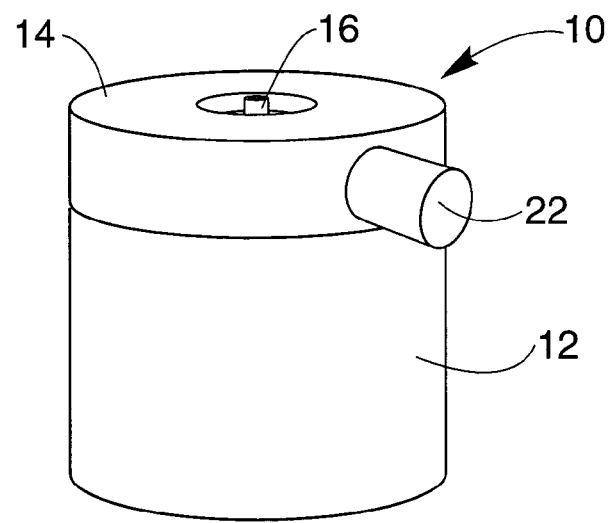
FIG. 1 is an overall perspective view of the optical fiber cleaver of the invention, including the receptacle affixed to the bending and cutting housing.

A detailed description of the invention and preferred embodiments is best provided by reference to the accompanying drawings wherein FIG. 1 is an overall perspective view of the cleaver apparatus 10 comprising an upper housing assembly 14 having port 16 into which is inserted a fiber to be cleaved and having affixed thereto the optional collecting receptacle 12 for collecting the cut-off ends of cleaved fibers. Plunger or push button 22 will be described in detail below.

Figure 2:
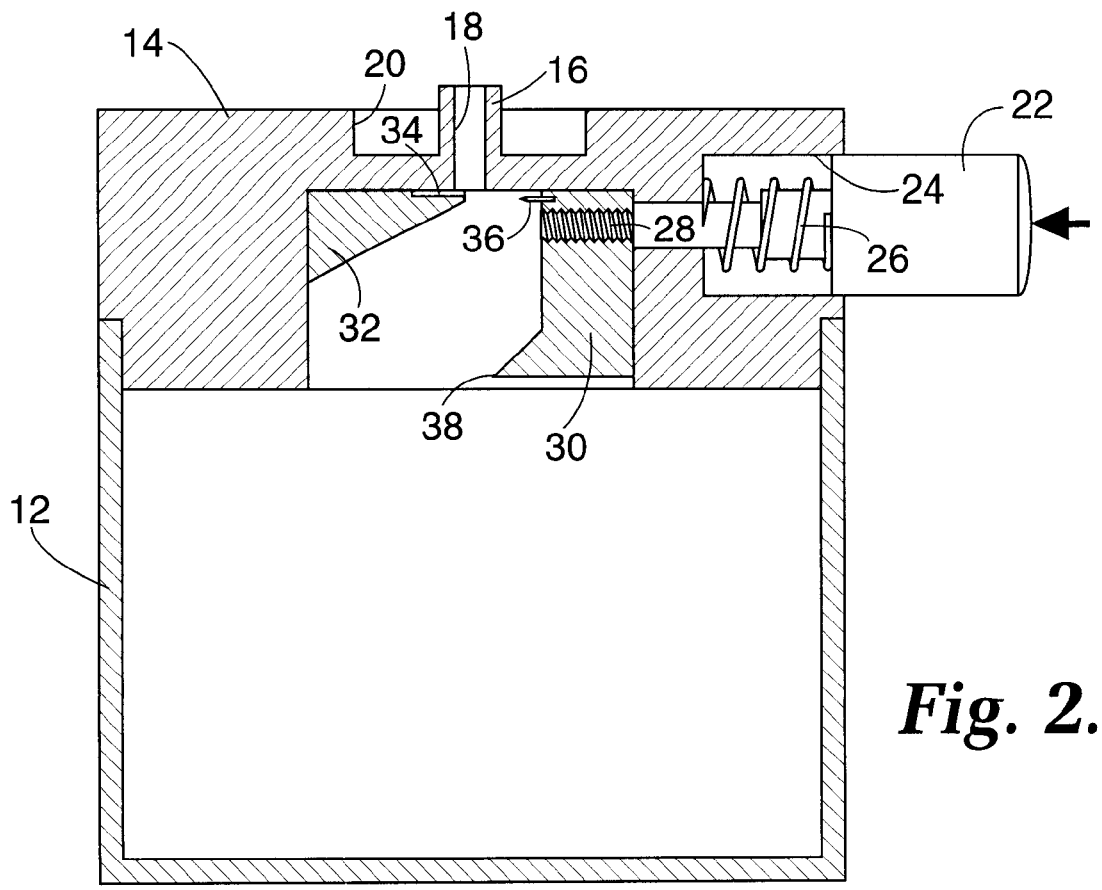
FIG. 2 is a cross-sectional view of the fiber cleaver of the invention taken substantially along line 2—2 of FIG. 6, with the optional receptacle included for completeness.
Figure 6:
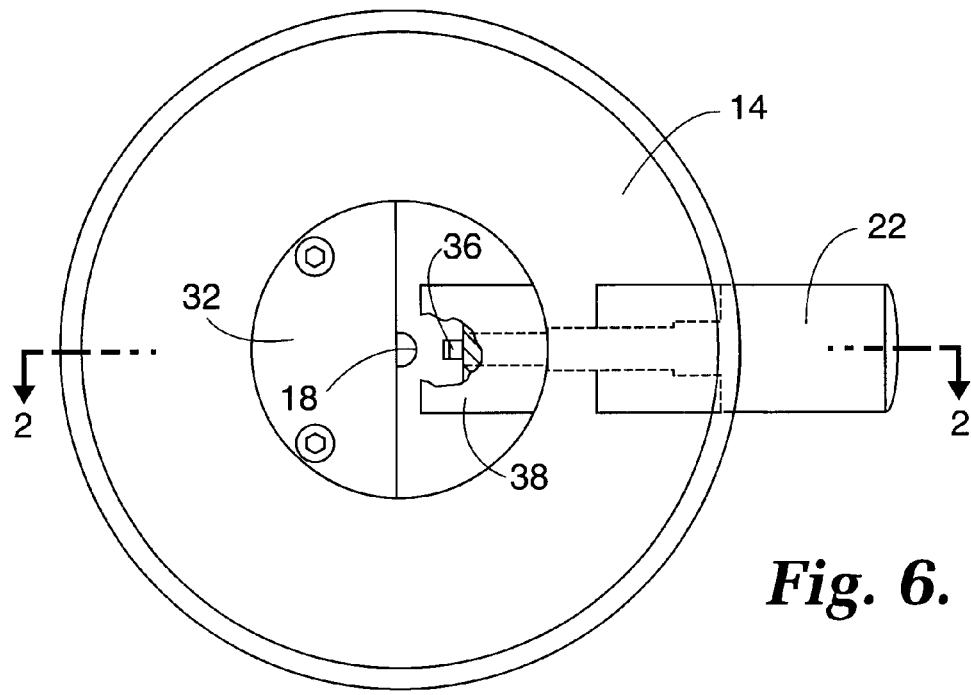
FIG. 6 is a bottom plan view of the housing assembly and the bending and cutting apparatus, partially broken away, according to a preferred embodiment of the invention.

The housing assembly 14 is shown in greater detail in its bottom plan view of FIG. 6 and in FIG. 2, which is a cross-section of the housing taken along line 2—2 of FIG. 6. FIG. 2 depicts port 16 having inside opening 18 and annular recess 20 machined into housing 14, which may be aluminum or other suitable material. Housing 14 is shown with optional receptacle 12, which may also be aluminum, affixed thereto, by friction fit. Receptacle 12 could be affixed by threads or other suitable connection means. In close proximity to the end of opening 18 where it opens into housing 14, and positioned at a predetermined depth from the opening, is shoulder or stop 34, cast or machined into support 32, this shoulder extending as shown, partially occluding the opening 18 into housing 14, for purposes which will become apparent in the description below.

Positioned diametrically across from support 32, as depicted in FIGS. 2 and 6, are the bending and cutting means which act upon an optical fiber to be cleaved. These bending and cutting means include the boot-shaped pushing head 30, with toe or apex 38 at its lower end and having affixed thereto, at its upper end and in close proximity to the exit of opening 18, a cutting blade, preferably a diamond knife blade, 36. Movement of the bending and cutting push boot assembly 30 is actuated by means of connecting rod 28, threaded as shown into boot 30, and connecting boot 30 to push button or plunger 22 which, upon pushing in the direction of the arrow shown, actuates the boot and blade 36 toward the opening 18. Spring 26 is provided for plunger 22 and is positioned within cylinder 24 to provide reciprocating movement of the bending and cutting means within the housing 14.

Figure 3:
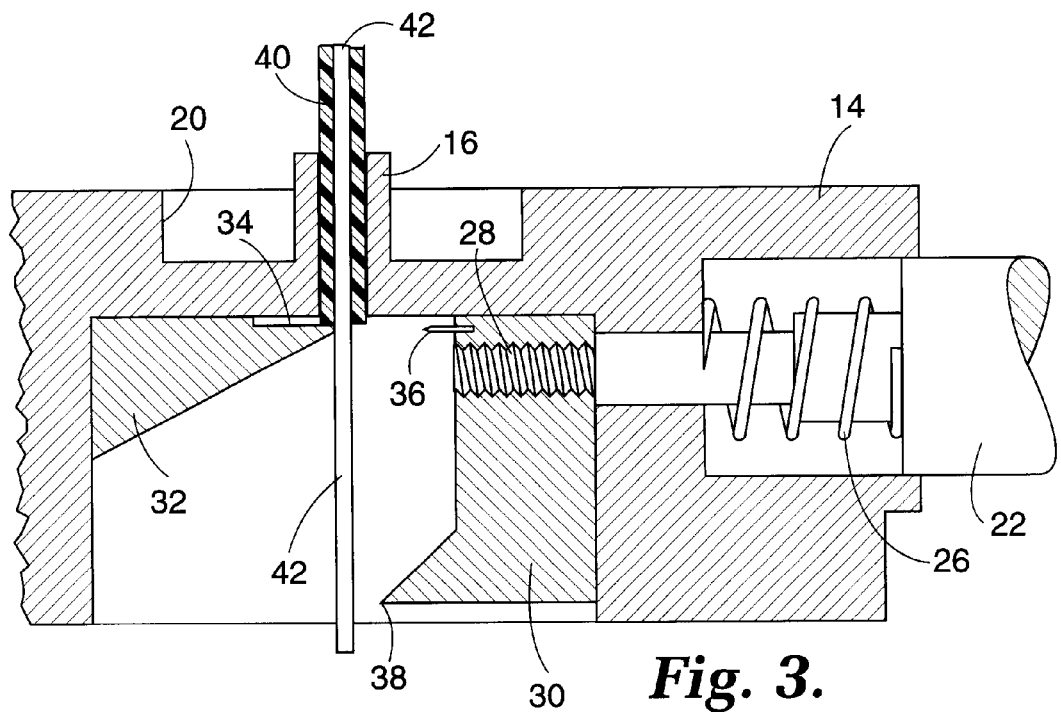
FIG. 3 is a cross-sectional view of the housing assembly containing the bending and cutting means of a preferred embodiment of the invention and showing the free end of a ferrule-encased optical fiber inserted into the opening in the housing prior to bending and cutting.

FIG. 3 is an exploded cross-sectional view of the housing 14, and is similar to FIG. 2 except that FIG. 3 shows an optical fiber 42 encased in a ceramic ferrule 40 inserted into port 16. To cut a fiber, say a 125 micrometer fiber 42 at a distance of 0.004 inch (100 micrometer) from the fiber ferrule, the exposed fiber itself clearly must be long enough such that the apex 38 of the boot 30 will bend the fiber before it is acted upon by blade 36. Thus, the operator must first strip the sheathing from the glass fiber 42, leaving for example, a 40 mm length of exposed fiber.

Next the exposed fiber should be cleaned with alcohol and the cable inserted and fixed by known techniques into the connector (not shown) so that the exposed fiber 42 extends past the end of the ferrule 40. The fiber 42 encased within the ferrule 40 is then inserted into port 16 through opening 18 as shown in FIG. 3, taking care not to break the exposed fiber extending longitudinally outwardly from the ferrule. Further insertion of the cable assembly will stop when the ferrule 40 encounters the shoulder 34.

Push button or plunger 22 is pushed once to cleave the fiber as discussed in detail below. The cleaved fiber is then polished at its end with coarse diamond film followed by polishing with fine diamond film.

The positioning of blade 36 is critical to the cleaving operation. For the fiber assembly described above, it should be positioned approximately 0.004 inch (100 micrometers) below the shoulder ledge 34 so as to act cooperatively with shoulder 34 in achieving a clean cut and providing the desired 0.004 inch length of fiber exposure. This fiber cleaver is suitable for cleaving glass fibers which are fixed in a variety of fiber optic connectors, including ST, SC and FT connectors which are presently those most frequently used.

Figure 4:
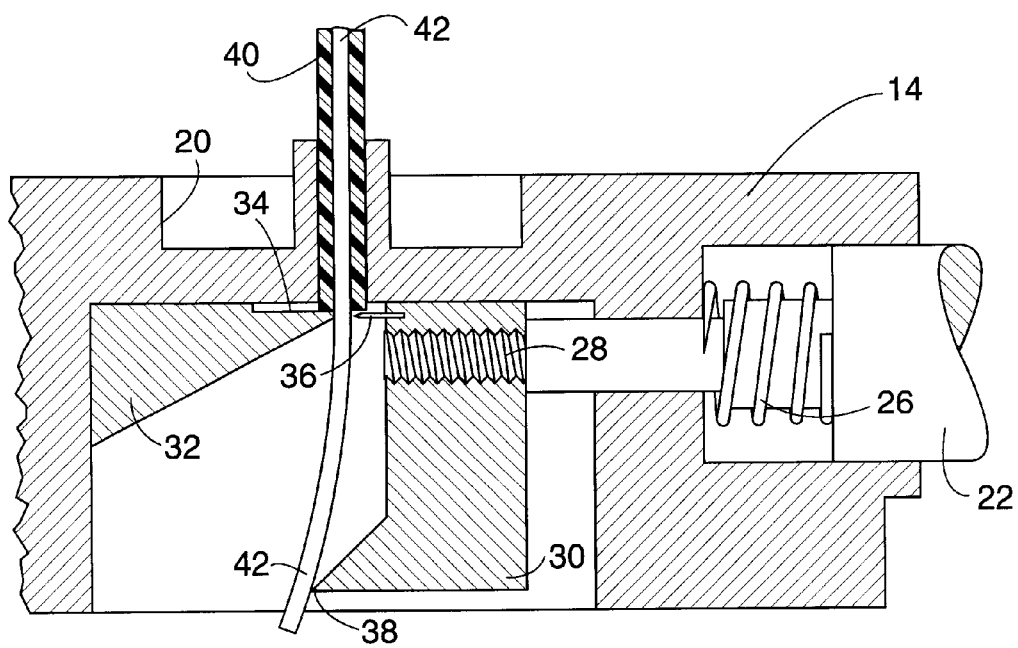
FIG. 4 is a cross-sectional view of the housing assembly showing an intermediate configuration of the bending and cutting apparatus and wherein the fiber is bent but not yet cut.
Figure 5:
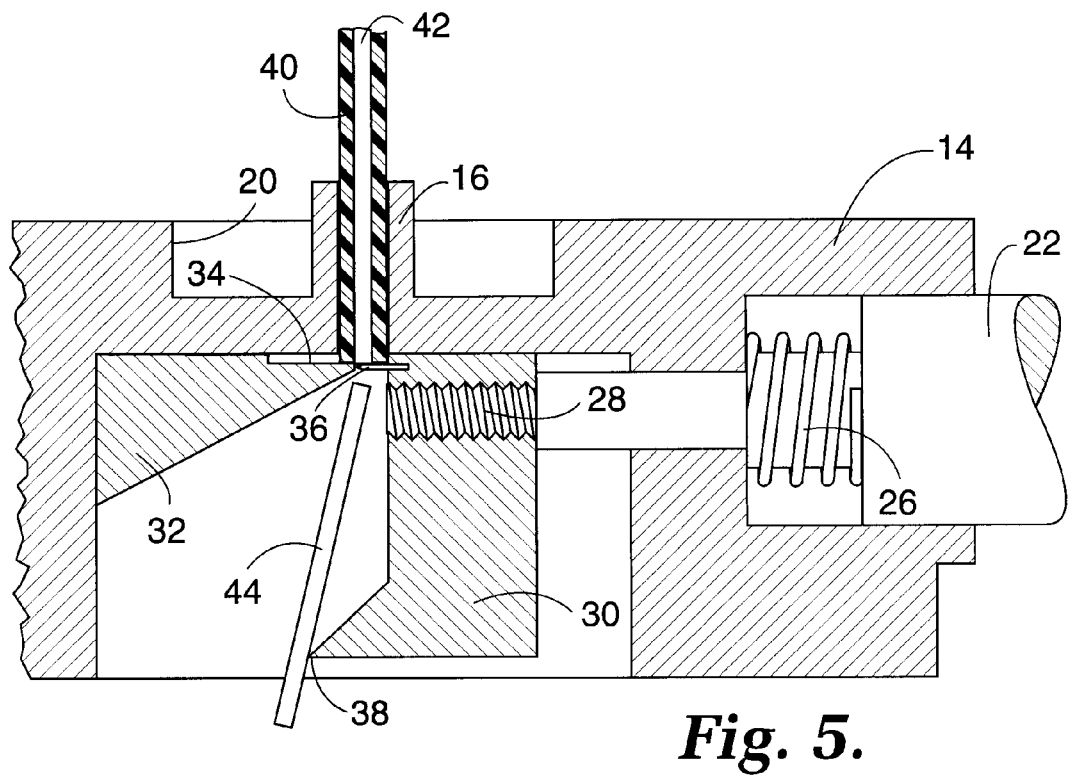
FIG. 5 is a cross-sectional view of the housing assembly showing the disposition of the bending and cutting apparatus at the completion of cleaving the fiber.

FIGS. 4 and 5 show successive stages of the cleaving operation in accordance with the present invention. In FIG. 4, an intermediate stage, the push button is depressed sufficiently to bend fiber 42 by the action thereon of apex or toe 38 of boot 30, thereby inducing tension in the glass fiber 42. FIG. 4 depicts the bent fiber just before cutting by blade 36.

FIG. 5 shows the apparatus just after cleaving of fiber 42 by blade 36, the cut end 44 falling away to be caught, optionally, in receptacle 12, not shown in FIG. 5.

FIG. 6 has been described hereinabove. The support 32 having stop shelf or shoulder 34 is depicted as a separate component in the assembly shown, bolted into the housing 14. However, one skilled in the art will know that this support can be cast or machined as a unitary component together with the housing 14.

While the invention has been disclosed herein in connection with certain embodiments and detailed descriptions, it will be clear to one skilled in the art that modification or variations of such details can be made without deviating from the gist of this invention, and such modifications or variations are considered to be within the scope of the claims hereinbelow.

What is claimed is:

1. A device for cleaving optical fibers comprising:
   a housing having an internal chamber and an opening extending between an exterior end opening toward an exterior of the housing and an inward end communicating with the internal chamber, the opening being sized and oriented to receive an optical fiber to be cleaved and permit the fiber therein to extend beyond the inward end of the opening and into the internal chamber;
   an inward facing fiber bending member having a radially inward producing member and an inward facing fiber cutting member mounted within the housing internal chamber and attached together for reciprocal movement together as a unit inward toward the fiber within the internal chamber and outward away from the fiber within the internal chamber, with the inward movement being along an inward travel path having a direction transverse to a longitudinal axis of the fiber when inserted into and extending through the opening and into the internal chamber, the fiber bending member being located spaced apart from the inward end of the opening along the longitudinal axis of the fiber when inserted into and extending through the opening and into the internal chamber, and the fiber cutting member being located between the fiber bending member and the inward end of the opening, the fiber bending member and the fiber cutting member being movable as a unit along the inward travel path for cleaving of the fiber from initial positions for each whereat the fiber can be inserted into the opening and extend through and beyond the inward end of the opening and into the internal chamber with the fiber bending and fiber cutting members out of contact with the fiber, through a first portion of the inward travel path and then through a second portion of the inward travel path to accomplish cleaving of the fiber, to a final position for each whereat the fiber is cleaved and the fiber bending member and the fiber cutting member can be returned as a unit to their initial positions, the fiber bending member being arranged such that during the first travel portion the protruding member of the fiber bending member contacts and bends the fiber to induce tension in the fiber with the fiber cutting member remaining out of contact with the fiber, and the fiber cutting member being arranged such that during the second travel portion the fiber cutting member contacts and at least partially cuts the fiber while the fiber bending member continues to contact and increase the bend of the fiber to cause separation of a cut end of the fiber as the fiber bending member and the fiber cutting member are moved toward their final positions;

an actuation member having a user operable portion positioned exterior of the housing for application of an inward force thereto and an engagement portion positioned to apply the inward force to the fiber bending and fiber cutting members to move the fiber bending and fiber cutting members along the inward travel path from their initial positions to their final positions; and a return member arranged to apply an outward force to the fiber bending and fiber cutting members to move the fiber bending and fiber cutting members outward along an outward travel path between their final positions and their initial positions when the inward force thereon is sufficiently removed, whereby after insertion of an optical fiber through the opening and into the internal chamber, the fiber bending and fiber cutting members are moved as a unit along the inward travel path by applying the inward force on the user operable portion of the actuation member to sequentially bend, and then cut and further bend the fiber to cleave off the cut end of the fiber.

2. The cleaving device of claim 1 wherein the internal chamber is of sufficient size to allow unobstructed insertion of the fiber beyond the inward end of the opening and into the internal chamber, with the fiber being unbent by the cleaving device when the fiber bending and fiber cutting portions are in their initial positions.

3. The cleaving device of claim 1 for use with a fiber enclosed by a sheath such that the fiber extends outwardly from the sheath exposing a free end portion thereof, wherein the opening is large enough to receive the sheath, and further including a positioning member positioned to engage and limit travel of the sheath into the internal chamber and hold the sheath at a predetermined location, the fiber cutting member being spaced apart away from the positioning member along the fiber when extending into the internal chamber by an amount sufficient to leave a predetermined, exposed length of the fiber extending beyond the sheath after the cut off end is separated from the fiber.

4. The cleaving device of claim 3 further including an internal member positioned within the internal chamber, the internal member having first and second surface portions, the first surface portion comprising the positioning member and being located toward the inward end of the opening and extending partially over the inward end of the opening to engage an inward end of the sheath while allowing the fiber to extend past the first surface portion and further into the internal chamber to a position to be engaged by the fiber bending portion of the head as the head moves along the inward travel path, and the second surface portion being positioned on an opposite side of the internal chamber from the head with the fiber therebetween when extending into the internal chamber, and extending laterally away from the fiber when extending into the internal chamber sufficient to remain out of contact with the fiber when in contact with and being bent by the fiber bending portion of the head as the head moves along the inward travel path.

5. A device for cleaving optical fibers comprising:

a housing having an internal chamber and an opening extending between an exterior end opening toward an exterior of the housing and an inward end communicating with the internal chamber, the opening being sized to receive an optical fiber to be cleaved and arranged to permit the fiber therein to extend beyond the inward end of the opening and into the internal chamber; and a fiber bending member having a radially inward protruding member and a fiber cutting member mounted to move within the housing internal chamber and each being reciprocally moveable inward and outward, with the inward movement being in a direction toward the fiber when inserted into and extending through the opening and into the internal chamber, the fiber bending member being located spaced apart from the inward end of the opening along the fiber when inserted into and extending through the opening and into the internal chamber, and the fiber cutting member being located between the fiber bending member and the inward end of the opening, the fiber bending member and the fiber cutting member being moveable for cleaving of the fiber from initial positions for each whereat the fiber can be inserted into the opening and extend through and beyond the inward end of the opening and into the internal chamber with the fiber cutting member out of contact with the fiber, the protruding member of the fiber bending member being arranged to move inward sufficiently to contact and bend the fiber to induce tension in the fiber with the fiber cutting member remaining out of contact with the fiber, and the fiber cutting member being arranged to then move inward sufficiently to contact and at least partially cut the fiber while the fiber bending member continues to contact and move inward sufficiently to further increase the bend of the fiber and cause separation of a cut end of the fiber.

6. The cleaving device of claim 5, further including an actuation member having a user operable portion positioned exterior of the housing for application of an inward force thereto, the actuation member being positioned to apply the inward force to the fiber bending member and the fiber cutting member to move the fiber bending member and the fiber cutting member inward from their initial positions to final positions thereof whereat the fiber is cleaved and the bending member and the fiber cutting member can be returned to their initial positions.

7. The cleaving device of claim 5, further including a return member arranged to apply an outward force to the fiber bending member and the fiber cutting member to move the fiber bending member and the fiber cutting member outward back to their initial positions after separation of the cut end of the fiber.

8. The cleaving device of claim 5 wherein the fiber bending member and the fiber cutting member are coupled to move inward as a unit.

9. The cleaving device of claim 8 wherein the fiber bending member extends inward beyond the fiber cutting member to contact the fiber before the fiber cutting member as the fiber bending member and the fiber cutting member move inward as a unit.

10. The cleaving device of claim 5 further including a receptacle removably connected to the housing and having a collection compartment in communication with the internal chamber and positioned and sized to receive and collect the cut off ends of a plurality of cleaved fibers.

11. The cleaving device of claim 5 wherein the internal chamber is of sufficient size to allow unobstructed insertion of the fiber beyond the inward end of the opening and into the internal chamber, with the fiber being unbent by the cleaving device when the fiber bending and fiber cutting members are in their initial positions.

12. The cleaving device of claim 5 for use with a fiber enclosed by a sheath such that the fiber extends outwardly from the sheath exposing a free end portion thereof, wherein the opening is large enough to receive the sheath, and further including a positioning member positioned to engage and limit travel of the sheath into the internal chamber and hold the sheath at a predetermined location, the fiber cutting member being spaced apart away from the positioning member by an amount sufficient to leave a predetermined, exposed length of the fiber extending beyond the sheath after the cut off end is separated from the fiber.

13. The cleaving device of claim 12 wherein said positioning member is a stop shoulder positioned in the internal chamber and extending partially over the inward end of the opening in the housing sufficient to engage an inward end of the sheath and limit travel of the sheath into the internal chamber while allowing the fiber to extend past the stop shoulder and further into the internal chamber to at least a position to be engaged by the fiber bending member and the fiber cutting member as they move inward.

14. The cleaving device of claim 5 for use with a fiber enclosed by a sheath such that the fiber extends outwardly from the sheath exposing a free end thereof, wherein the opening is large enough to receive the sheath, further including an internal member positioned within the internal chamber, the internal member having first and second surface portions, the first surface portion comprising a positioning member and being located toward the inward end of the opening and extending partially over the inward end of the opening to engage an inward end of the sheath while allowing the fiber to extend past the first surface portion and further into the internal chamber to a position to be engaged by the fiber bending as the first bending member moves inward, and the second surface portion being positioned on an opposite side of the internal chamber from the fiber cutting and fiber bending members with the fiber therebetween when extending into the internal chamber, and extending laterally away from the fiber when extending into the internal chamber sufficient to remain out of contact with the fiber when in contact with and being bent by the fiber bending member as the fiber cutting and fiber bending members move inward.

15. The cleaving device of claim 5 further including a user operable actuation member for manual application of an operational force thereto, the user operable member including a connecting member connected to the fiber bending member and the fiber cutting member to transmit the user operational force thereto to move the fiber bending member and the fiber cutting member inward.

16. The cleaving device of claim 15 wherein the actuation member includes a manually depressible plunger for manual application of the operational force thereto, the plunger being reciprocally mounted within a chamber in a sidewall of the housing.

17. The cleaving device of claim 16 wherein the plunger is positioned at a location of the sidewall for depressing by a thumb of the user's hand grasping the housing.

18. The cleaving device of claim 5 wherein the fiber bending member in its initial position is located out of contact with the fiber when inserted into the opening and extends through and beyond the inward end of the opening and into the internal chamber.

19. The cleaving device of claim 5 wherein the fiber cutting and fiber bending members comprise portions of a head mounted within the internal chamber for reciprocal movement inward and outward, with the inward movement being in the direction toward the fiber when inserted into and extending through the opening and into the internal chamber, and the cleaving device further includes a user operable member for manual application of an operational force thereto, the user operable member being coupled to the head to apply the operational force to the head to move the head inward in response thereto.

20. A device for cleaving optical fibers comprising:
 a housing having an opening sized to receive an optical fiber to be cleaved and arranged to permit the fiber therein to extend beyond an end of the opening with the fiber unbent by the cleaving device; and
 a fiber bending member having a radially inward protruding member and a fiber cutting member mounted to move with respect to the housing and each being reciprocally moveable inward and outward, with the inward movement being in a direction toward the fiber when inserted into and extending through the opening, the fiber bending member being located spaced apart from the end of the opening along the fiber when inserted into and extending through the opening, and the fiber cutting member being located between the fiber bending member and the end of the opening, the fiber bending member and the fiber cutting member being moveable for cleaving of the fiber from initial positions for each whereat the fiber can be inserted into the opening and extend through the opening with the fiber cutting member out of contact with the fiber, the protruding member of the fiber bending member being arranged to move inward sufficiently to contact and bend the fiber to induce tension in the fiber with the fiber cutting member remaining out of contact with the fiber, and the fiber cutting member being arranged to then move inward sufficiently to contact and at least partially cut the fiber while the fiber bending member continues to contact and bend the fiber, thereby causing separation of a cut end of the fiber.

21. The cleaving device of claim 20 wherein the fiber bending member in its initial position is located out of contact with the fiber when inserted into and extending through the opening.

22. The cleaving device of claim 20 wherein the fiber cutting and fiber bending members comprise portions of a head mounted for reciprocal movement relative to the housing inward and outward, with the inward movement being in the direction toward the fiber when inserted into and extending through the opening, and the cleaving device further includes a user operable member for manual application of an operational force thereto, the user operable member being coupled to the head to apply the operational force to the head to move the head inward in response thereto.

23. The cleaving device of claim 20 wherein the fiber bending member and the fiber cutting member are coupled to move inward as a unit.

24. The cleaving device of claim 23 wherein the fiber bending member extends inward beyond the fiber cutting member to contact the fiber before the fiber cutting member as the fiber bending member and the fiber cutting member move inward as a unit.

25. The cleaving device of claim 20 further including a return member arranged to apply an outward force to the fiber bending member and the fiber cutting member to move the fiber bending member and the fiber cutting member outward back to their initial positions after separation of the cut end of the fiber.

* * * * *